June 30, 1931. H. ALBERTINE 1,812,643
GREASE GUN CONTROL MECHANISM
Filed June 26, 1929
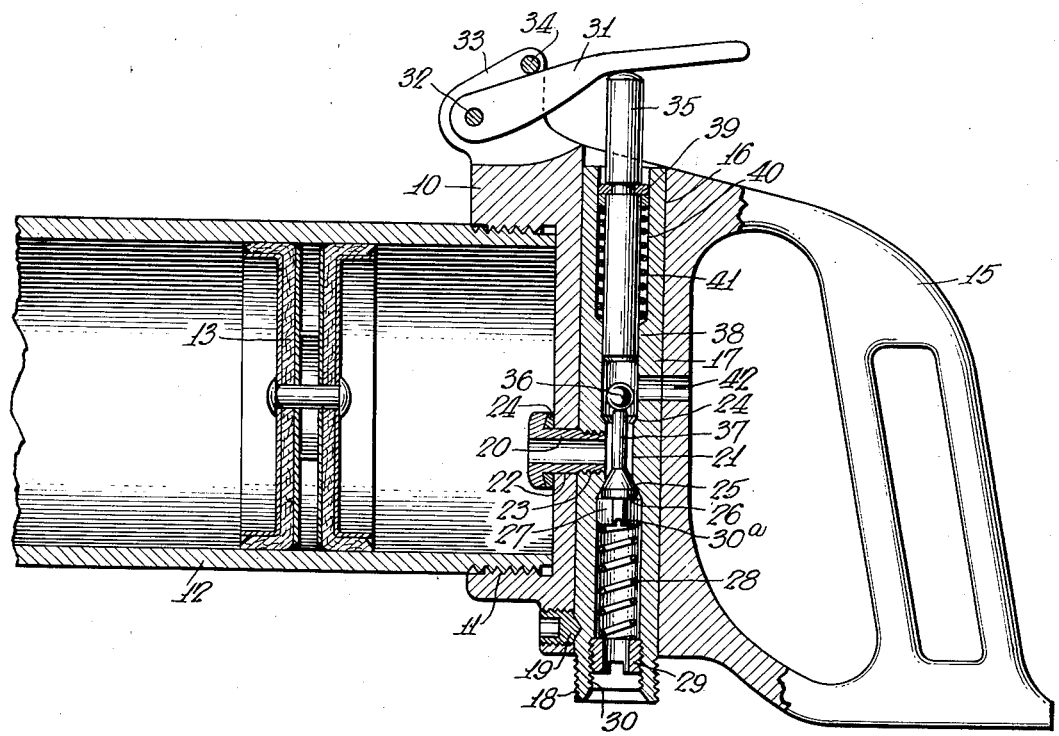
INVENTOR
*Herman Albertine*
BY
*George C. Wean*
ATTORNEY Patented June 30, 1931

1,812,643

UNITED STATES PATENT OFFICE

HERMAN ALBERTINE, OF RUTHERFORD, NEW JERSEY, ASSIGNOR TO ROGERS PRODUCTS COMPANY, INC., A CORPORATION OF NEW JERSEY

GREASE GUN CONTROL MECHANISM

Application filed June 26, 1929. Serial No. 373,720.

The present invention in its broader aspects is concerned with the provision of valving for controlling the admission and exhaust of fluid under pressure from a working chamber. Such valving is particularly suited for embodiment in grease guns and when so used is adapted to be manually controlled and to regulate the admission and exhaust of compressed air to operate the grease expelling piston of the gun.

The apparatus is primarily an improved valve and trigger mechanism for a grease gun of the pistol grip type such as that shown in my prior Patent No. 1,633,356, granted June 21, 1927, in which thumb control of the valve is possible while the gun handle is gripped with the fingers.

The objects include making the valve mechanism proof against leak from the air line when the gun is not in use and also substantially proof against leak from the cylinder when the air pressure is applied to the piston. The valving is simple and inexpensive in construction and rugged and durable to withstand the rough handling to which the guns are subjected in their ordinary course of use.

Other objects are to make the mechanism more proof against the destructive effect of moisture carried by the compressed air and the parts easily accessible for repair or replacement. The valve mechanism is capable of independent assemblage and ready of bodily application to the handle casting of the gun. The main valve control is readily accessible for purposes of regrinding without any need for removing the valve assemblage from the handle.

The invention may be more fully understood from the following description in connection with the accompanying drawing which is a fragmentary view mainly in longitudinal section and partly in elevation of a grease gun embodying the invention.

The handle casting 10 of the gun is provided with a threaded socket 11 into which the cylinder or barrel 12 constituting the grease reservoir is screwed. I have indicated generally at 13 a grease expelling piston of the double cup washer type. The outlet structure of the gun forms no part of the present invention and is not shown, it being understood that any conventional type of outlet fitting might be employed.

The handle casting 10 is shaped to provide a finger grip portion 15 and is formed with a transverse cylindrical bore 16 in advance of the handle grip portion and into which the entire valve mechanism, having been preassembled, may be inserted as a unit.

The valve mechanism includes the tubular valve casing 17 adapted to snugly fit the bore 16 and having a longitudinal passageway extending from end to end thereof.

The lower end of the tube 17 preferably projects beyond the bore 16 and is externally threaded for the reception of a conventional air hose coupling (not shown).

The sleeve or casing 17 is secured against translational or rotational movement in the bore 16 by a conventional set screw 19 and further by a hollow headed screw 20, the interior passage of which communicates with the reduced central portion 21 of the valve casing bore. The unthreaded portion of screw 20 closely fits a bore 22 connecting the socket 11 with the bore 16 and the threaded end of the screw engages a transversely threaded opening 23 in the sleeve 17. A packing ring or washer 24 interposed between the head of the screw and the bottom of the socket prevents any leak of air around the outside of the unthreaded portion of the screw and as the latter is tightened valve casing 17 is drawn into firm engagement with the wall of the bore 16 preventing any leak of air around the valve casing itself.

Upwardly and downwardly facing valve seats 24 and 25 are provided at the upper and lower ends of bore section 21. A valve 26 having a conical working portion and a generally squared head 27 coacts with the seat 25. This valve forced upwardly against its seat by a coiled expansion spring pressing against the squared head 27 and reacting against a collar member 29 screwed into an internal socket 30 in the bottom of tube 17. This collar may be adjusted in and out to regulate the tension on the valve. If the valve 26 becomes clogged by a particle of dirt a screw driver may be conveniently inserted through collar 29 and engaged with a screw driver slot 30ᵃ in the valve head 27 whereby to grind the valve on the seat and destroy or displace the clogging particle.

Valve 26 being normally held seated by its spring 28 as well as by the air pressure thereon acts to normally prevent flow of air into the reservoir 12 behind the piston 13. Means is provided for manually unseating this valve this means is controlled by a trigger lever 31 pivoted at 32 between lugs 33 at the top of the handle casting and upward movement of the lever 31 is limited by the stop pin 34. The free end of the lever may be conveniently depressed by the thumb of the operator while he grasps the handle with his fingers, and when depressed moves a plunger member 35 downwardly in the bore of the sleeve 17. This plunger when depressed acts through a free floating ball valve 36 to engage the upwardly extending stem or extension 37 of the valve 26, unseating this valve and permitting air to flow around the squared head 27 and through the screw 20 into the cylinder 12. Plunger 35 has its lower end guided in a slightly enlarged portion 38 of the sleeve bore immediately above the valve seat 24. The upper end of the plunger carries a collar 39 guided in the further enlarged top portion 40 of this bore. A coiled spring 41 encircling the plunger accommodated in bore portion 40 backed against the bottom thereof and exerts tension on the collar 39 to normally elevate plunger 35 to an extent limited by engagement of lever 31 with its stop 34.

The vent opening 42 for the compressed air from the cylinder is disposed between the lower end of the plunger 35 and the seat 24 for the ball valve 36.

The operation of the device is as follows:

Assuming an air line to be coupled to the lower end of the sleeve 17 and the parts to be in their inactive illustrated condition. Depression of the thumb lever 31 moves the plunger downwardly causing it to engage the ball valve 36 and through this ball valve to unseat the inlet valve 26. Cracking the valve 37 off its seat, however, will permit momentary escape of air through the vent 42, but further depression of the lever 31 seats the valve 36, effectively cutting off communication between the vent and the source of air supply and causing the air to rush into the cylinder 12 and act on the piston 13. When sufficient grease has been expelled the handle lever 31 is released. Plunger 35 springs back to its elevated position. Valve 25 is seated by its spring. The ball valve 36 is knocked or blown off its seat and the air exhausts freely through valve passages 21, 38 and the vent opening 42.

I have found in practice that even though the vent openings being of circular shape the force of the air stream prevents the ball from seating over and closing the opening. Furthermore the actual shape of the exhaust opening mouth is elliptical, due to the fact that it is a circular bore intersecting a cylindrical surface and it is impossible for the ball check to fit such an opening.

In order to prevent rust, springs 28 and 40 are preferably of bronze as are also the inlet valve and the plunger 35. The ball, 36, however, is usually of steel construction to avoid flats. There is little tendency for rust to collect on this ball due to the manner in which the ball is knocked about in use and due to the fact that the ball is more or less a self-grinding valve.

I claim:

1. In a grease gun of the character in which fluid under pressure acting in a working chamber supplies the motive force for expelling grease, a control handle at the rear end of said working chamber, a transverse passage, open at both ends, arranged between the handle and the working chamber and means associated therewith for controlling the admission and exhaust of motive fluid to and from said chamber, said means comprising a unitary valving assemblage bodily applicable to and removable from said transverse passage.

2. In a grease gun of the character in which fluid under pressure acting in a working chamber supplies the motive force for expelling grease, a control handle, at the rear end of said working chamber, a transverse passage, open at both ends, arranged between the handle and the working chamber and means associated therewith for controlling the admission and exhaust of motive fluid to and from said chamber, said means including a normally seated inlet valve to control the flow of fluid to the chamber, a vent normally open to said chamber, and a valve movable to block escape of fluid from said chamber through the vent only when the inlet valve is opened, all of said controlling elements being mounted in a tubular valve casing fitting said transverse passage and held from movement therein by transverse screw means.

3. In a grease gun of the character in which fluid under pressure acting in a working chamber supplies the motive force for expelling grease, a control handle, at the rear end of said working chamber, a transverse passage, open at both ends, arranged between the handle and the working chamber and means associated therewith for controlling the admission and exhaust of motive fluid to and from said chamber, said means including a normally seated inlet valve to control the flow of fluid to the chamber, a vent normally open to said chamber, and a valve movable to block escape of fluid from said chamber through the vent only when the inlet valve is opened, means including said second mentioned valve, to unseat the inlet valve, all of said controlling elements being mounted in a tubular valve casing fitting said transverse passage and held from movement therein by transverse screw means.

4. In a grease gun of the character in which fluid pressure acting in a working chamber supplies the motive force for expelling grease, a control handle, at the rear end of said working chamber, a transverse passage, open at both ends, arranged between the handle and the working chamber and means associated therewith for controlling the admission and exhaust of motive fluid to and from said chamber, said means comprising a normally spring seated inlet valve controlling the flow of motive fluid to the chamber, manually operable means to unseat said valve, a vent normally freely communicating with the chamber, and means operable only when the inlet valve is opened to cut off communication between the chamber and the vent, all of said controlling elements being mounted in a tubular valve casing fitting said transverse passage and held from movement therein by transverse screw means.

5. In a grease gun of the character in which fluid under pressure acting in a working chamber supplies the motive force for expelling grease, a control handle, at the rear end of said working chamber, a transverse passage, open at both ends, arranged between the handle and the working chamber and means associated therewith for controlling the admission and exhaust of motive fluid to and from said chamber, said means comprising a spring seated inlet valve to the chamber, a vent freely communicating with the chamber and means to unseat the inlet valve and block communication between the chamber and the vent, all of said controlling elements being mounted in a tubular valve casing fitting said transverse passage and held from movement therein by transverse screw means.

6. In a grease gun of the character in which fluid under pressure acting in a working chamber supplies the motive force for expelling grease, a control handle, at the rear end of said working chamber, a transverse passage, open at both ends, arranged between the handle and the working chamber and means associated therewith for controlling the admission and exhaust of motive fluid to and from said chamber, said means comprising a unitary valving assemblage bodily applicable to and removable from said passage and including a tubular member having a lateral bore connecting its interior with a working chamber, said bore being in the form of a screw sleeve which locks said tubular member to prevent rotary or longitudinal movement thereof.

7. In a grease gun of the character in which fluid under pressure acting in a working chamber supplies the motive force for expelling grease, a control handle, at the rear end of said working chamber, a transverse passage, open at both ends, arranged between the handle and the working chamber and means associated therewith for controlling the admission and exhaust of motive fluid to and from said chamber, said means comprising a unitary valving assemblage bodily applicable to and removable from said passage, said assemblage including a tubular member fitting said transverse passage, together with a key screw for locking said tubular member against longitudinal and rotary movement.

8. In a grease gun of the character in which fluid under pressure acting in a working chamber supplies the motive force for expelling grease, a control handle, at the rear end of said working chamber, a transverse passage, open at both ends, arranged between the handle and the working chamber and means associated therewith for controlling the admission and exhaust of motive fluid to and from said chamber, said means comprising a unitary valving assemblage bodily applicable to and removable from said passage; and means to secure the assemblage in the passage, the handle having ports therein communicating with the working chamber and with the vent respectively and alined with corresponding ports in the casing of the valve assemblage.

9. A grease gun of the character described, including means whereby fluid under pressure acting in a working chamber supplies the motive power for expelling grease, and means associated therewith for controlling the admission and exhaust of motive fluid to and from said chamber, said means including a casing having a longitudinal bore extending therethrough, adapted to be coupled at one end to a source of fluid under pressure, ports intersecting the intermediate portion of the bore for communication with a working chamber and vent respectively, a spring seated inlet valve between the air inlet and said ports, a valve seat between said ports, a valve for coaction with said seat, a plunger normally spring retracted and acting when depressed to seat said valve, an extension on the inlet valve operable by the plunger to unseat the inlet valve.

10. A grease gun of the character described, including means whereby fluid under pressure acting in a working chamber supplies the motive power for expelling grease, and means associated therewith for controlling the admission and exhaust of motive fluid to and from said chamber, said means including a casing having a longitudinal bore extending therethrough, adapted to be coupled at one end to a source of fluid under pressure, ports intersecting the intermediate portion of the bore for communication with a working chamber and vent respectively, a spring seated inlet valve between the air inlet and said ports, a valve seat between said ports, a valve for coaction with said seat, a plunger normally spring retracted and acting when depressed to seat said valve, an extension on the inlet valve operable by the plunger to unseat the inlet valve, a manually operable element to depress the plunger.

11. A grease gun of the character described, including means whereby fluid under pressure acting in a working chamber supplies the motive power for expelling grease, and means associated therewith for controlling the admission and exhaust of motive fluid to and from said chamber, said means including a casing having a longitudinal bore extending therethrough, adapted to be coupled at one end to a source of fluid under pressure, ports intersecting the intermediate portion of the bore for communication with a working chamber and vent respectively, a spring seated inlet valve between the air inlet and said ports, a valve seat between said ports, a valve for coaction with said seat, a plunger normally spring retracted and acting when depressed to seat said valve, an extension on the inlet valve operable by the plunger to unseat the inlet valve, a manually operable element to depress the plunger, means to limit the movement last mentioned element and thereby the spring impelled movement of the plunger.

12. A grease gun of the character described, including means whereby fluid under pressure acting in a working chamber supplies the motive power for expelling grease, and means associated therewith for controlling the admission and exhaust of motive fluid to and from said chamber, said means including a casing having a longitudinal bore extending therethrough, adapted to be coupled at one end to a source of fluid under pressure, ports intersecting the intermediate portion of the bore for communication with a working chamber and vent respectively, a spring seated inlet valve between the air inlet and said ports, a valve seat between said ports, a valve for coaction with said seat, a plunger normally spring retracted and acting when depressed to seat said valve, an extension on the inlet valve operable by the plunger to unseat the inlet valve, said second mentioned valve comprising a free floating ball arranged between the plunger and the inlet valve extension.

13. A grease gun of the character described, including means whereby fluid under pressure acting in a working chamber supplies the motive power for expelling grease, and means associated therewith for controlling the admission and exhaust of motive fluid to and from said chamber, said means including a casing having a longitudinal bore extending therethrough, adapted to be coupled at one end to a source of fluid under pressure, ports intersecting the intermediate portion of the bore for communicating with a working chamber and vent respectively, a spring seated inlet valve between the air inlet and said ports, a valve seat between said ports, a valve for coaction with said seat, a plunger normally spring retracted and acting when depressed to seat said valve, an extension on the inlet valve operable by the plunger to unseat the inlet valve, said second mentioned valve comprising a free floating ball arranged between the plunger and the inlet valve extension, and acting to first unseat the inlet valve and then seat itself as the plunger is depressed.

Signed at New York, in the county of New York, and State of New York, this 25th day of June, A. D. 1929.

HERMAN ALBERTINE.